(No Model.) 5 Sheets—Sheet 1.

T. WALKER & J. F. CARTER.
ORE ROASTING FURNACE.

No. 280,102. Patented June 26, 1883.

WITNESSES: INVENTORS (No Model.) 5 Sheets—Sheet 2.

T. WALKER & J. F. CARTER.
ORE ROASTING FURNACE.

No. 280,102. Patented June 26, 1883.

WITNESSES

INVENTORS

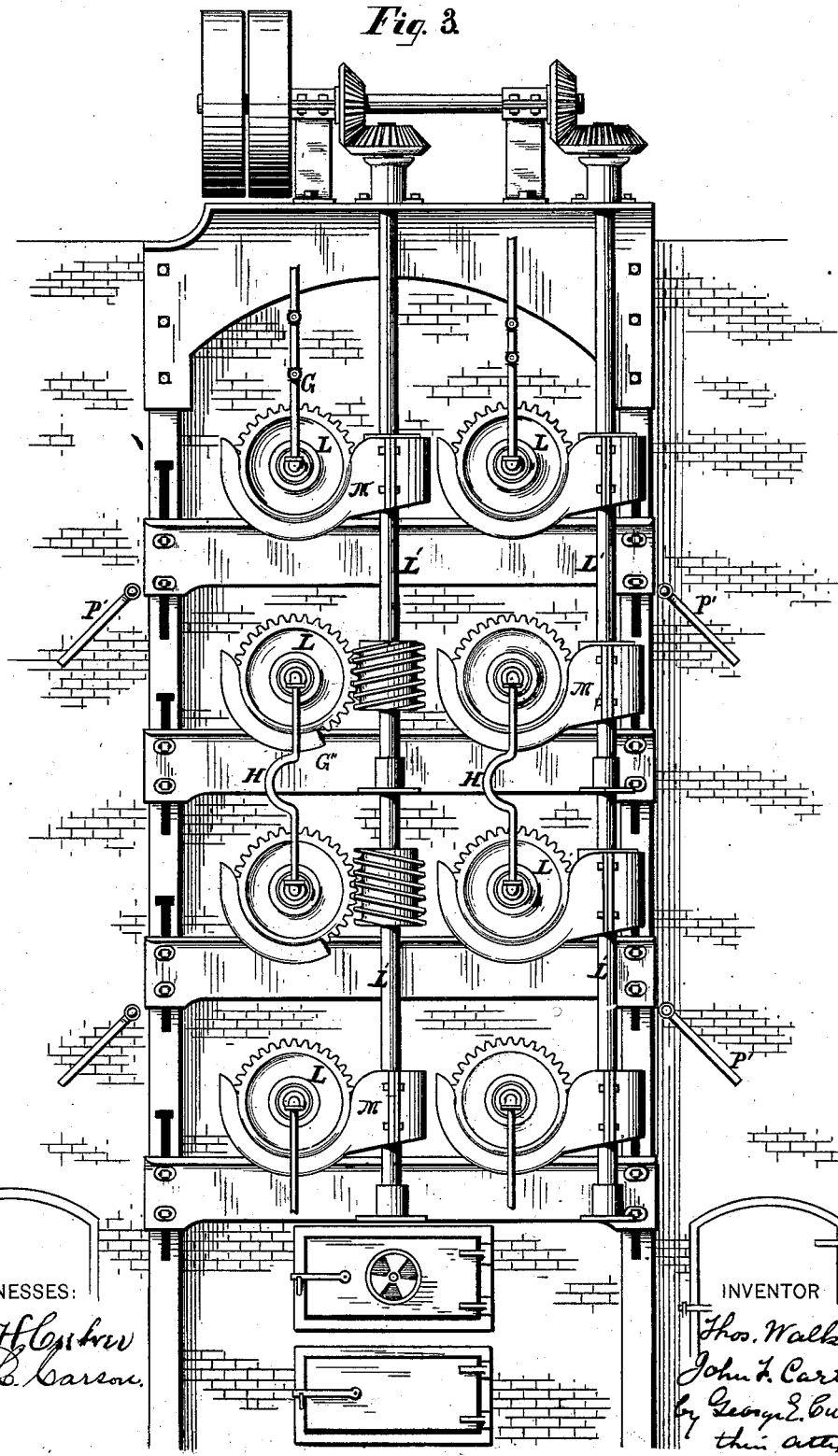

(No Model.) 5 Sheets—Sheet 4.
T. WALKER & J. F. CARTER.
ORE ROASTING FURNACE.
No. 280,102. Patented June 26, 1883.
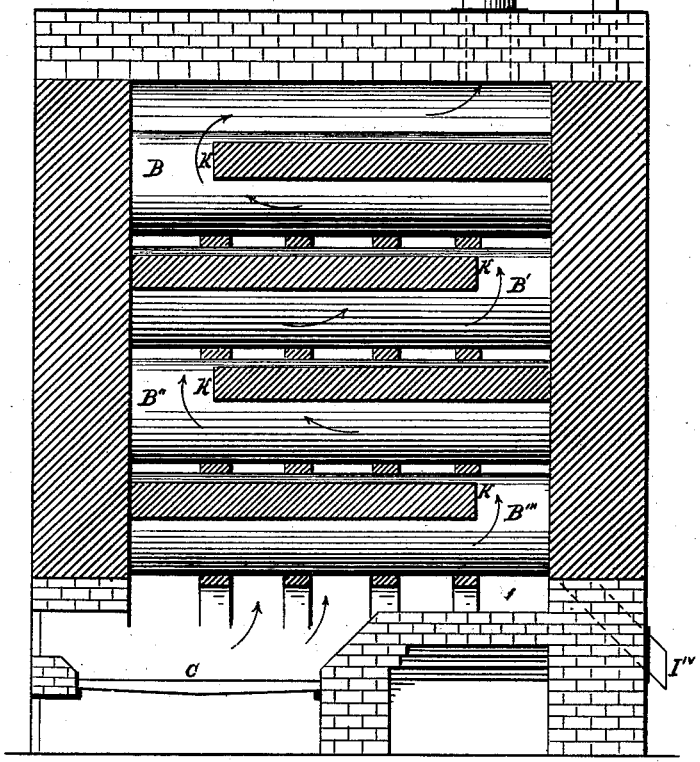
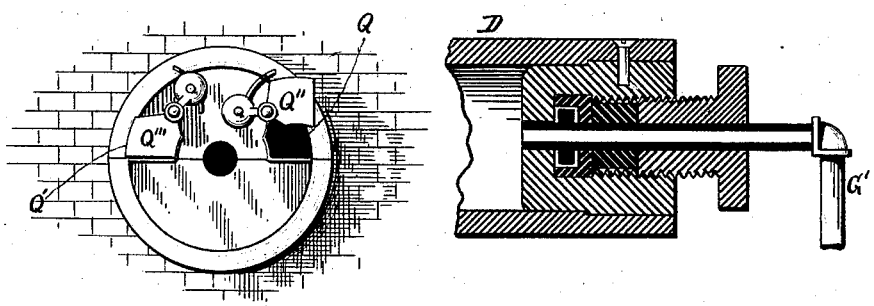
WITNESSES:
INVENTOR (No Model.) 5 Sheets—Sheet 5.
T. WALKER & J. F. CARTER.
ORE ROASTING FURNACE.
No. 280,102. Patented June 26, 1883.
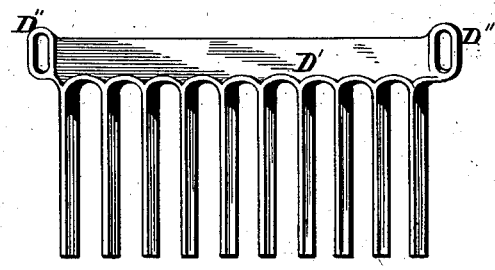
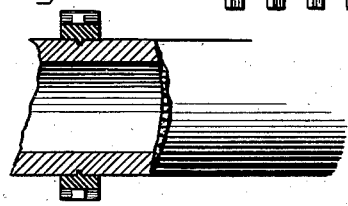
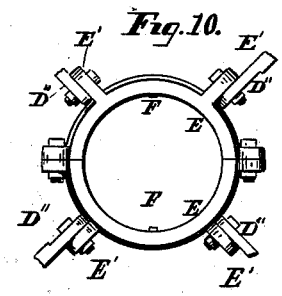
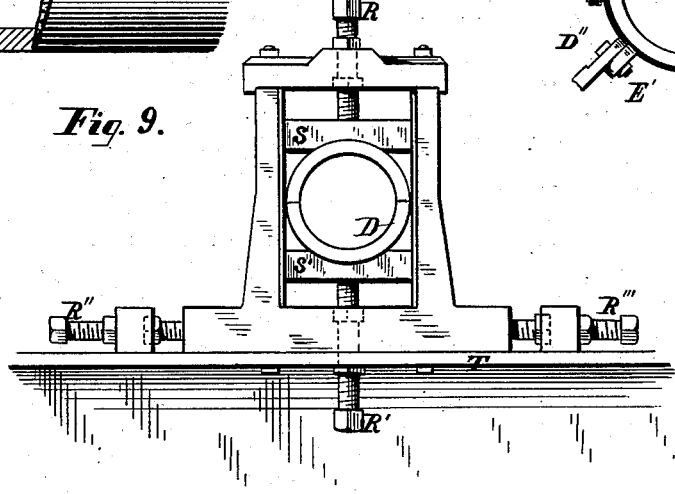
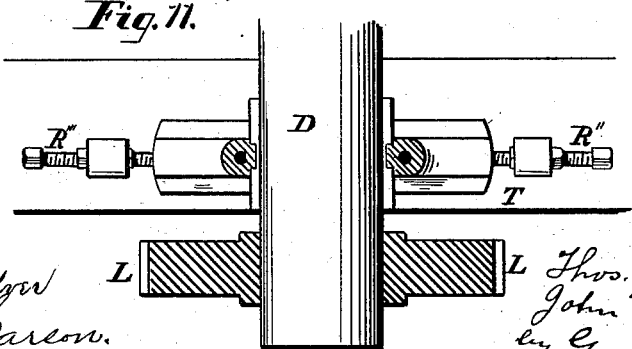
WITNESSES:
INVENTOR

UNITED STATES PATENT OFFICE.

THOMAS WALKER AND JOHN F. CARTER, OF PHILADELPHIA, PENNSYLVANIA, ASSIGNORS TO SAID WALKER.

ORE-ROASTING FURNACE.

SPECIFICATION forming part of Letters Patent No. 280,102, dated June 26, 1883.

Application filed April 19, 1883. (No model.)

*To all whom it may concern:*

Be it known that we, THOMAS WALKER and JOHN F. CARTER, citizens of the United States, and residents of Philadelphia, Pennsylvania, have invented a new and useful Improvement in Ore-Roasting Furnaces; and we do hereby declare the following to be a full, clear, and exact description of the same, reference being had to the annexed drawings, making part hereof.

The nature of our invention will fully appear from the following description and claims.

The object of our invention is to automatically, continuously, rapidly, and cheaply desulphurize, oxidize, and chloridize properly-prepared ores, also to generate sulphurous-acid fumes from pyrites.

Figure 1:
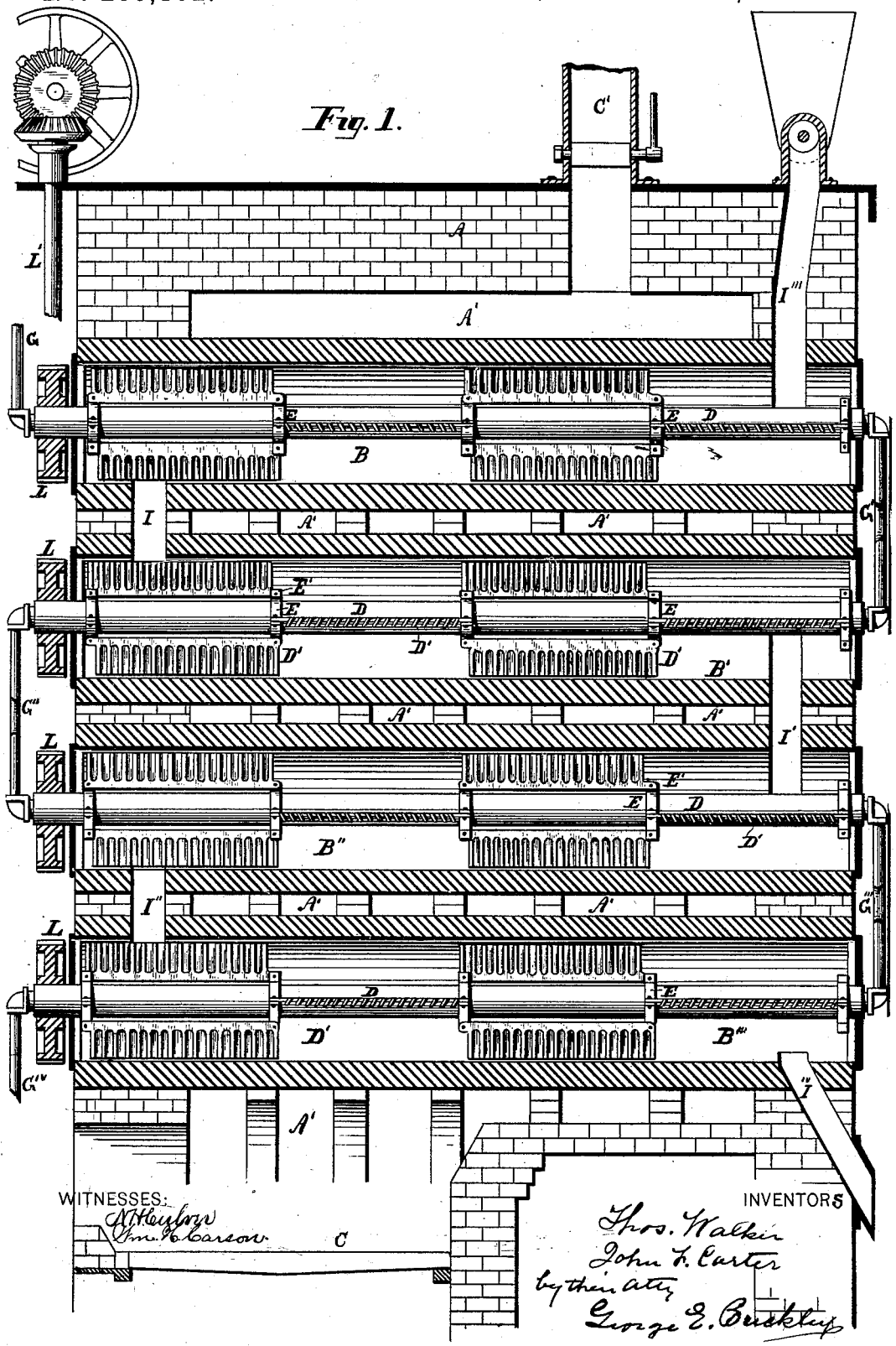
Figure 2:
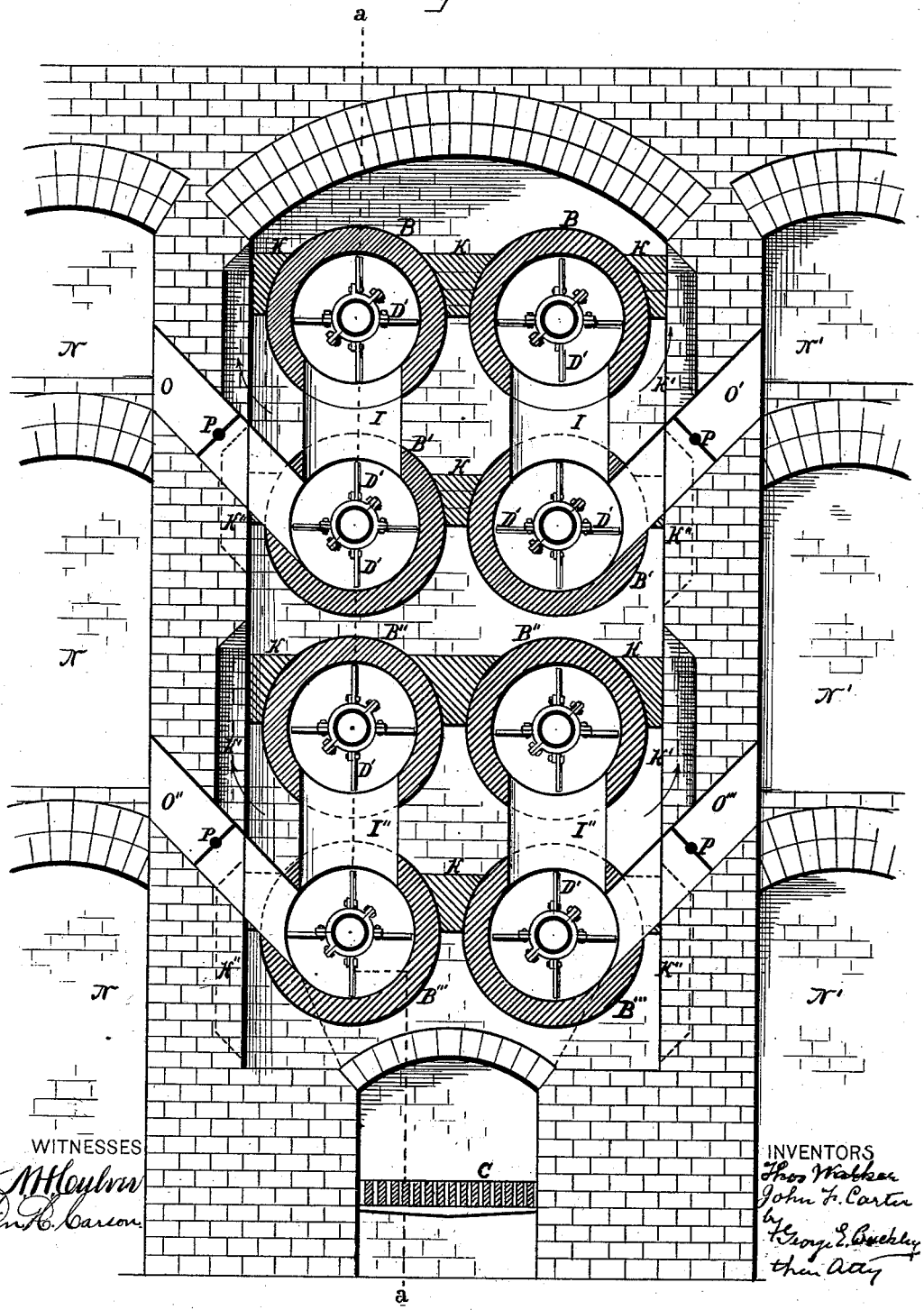

In the drawings, Figure 1, Sheet 1, is a vertical longitudinal sectional view of our device on the line $a\ a$ of Fig. 2. Fig. 2, Sheet 2, is a vertical cross-sectional view of our device, showing the positions of the retorts, with the dust-chambers and gas and air exit flues; Fig. 3, Sheet 3, a front view of our device, showing the arrangement of pulleys, gears, and shafting for revolving the rakes or vanes within the retort, and the kinked or bent water-pipes connecting the various hollow shafts which carry the rakes, and for conveying water from shaft to shaft. Fig. 4, Sheet 4, is a view of our furnace, showing the zigzag direction of the heat-currents or products of combustion from the furnace-fire around the retorts until they reach the exit flue or stack; Fig. 5, an end view of one of the retorts projecting through the wall, showing the closing and adjustable covers over the air-admission openings in the retort; Fig. 6, a detached longitudinal sectional view of one end of a rake-bearing hollow shaft, showing the pipe for carrying water therefrom and the means for securing said pipe in the end of said shaft; Fig. 7, Sheet 5, a detached view of one of our rake or vane sections; Fig. 8, a detached part perspective and part sectional view of a broken section of one of our hollow rake-bearing shafts, with the ring or clamp which holds the rakes shown in cross-section upon it; Fig. 9, an end view of the housing in which the journals of the hollow shafts rest, which is adjustable vertically and laterally; Fig. 10, a view of one of our clamps for securing the rakes to the hollow shaft; Fig. 11, a partly-horizontal sectional view of the housing shown in Fig. 9, showing the end of the hollow shaft in place therein, and a similar section of the gear-wheel on the end of the same, whereby it is driven.

A is the shell or wall of the furnace; A', the heating-space around the retorts B B', &c., said space extending from fire-place C to the flue or stack C'. The cylindrical retorts B B', &c., are about horizontal, and extend from front to back of the furnace, the ends of the retorts being built into and supported by the front and rear walls of the furnace, and projecting through to the respective outer surfaces thereof. Within each retort is a hollow shaft, D, which passes through each end or head of the retort, and is provided within the retort with the rake arms or vanes D'. These rakes are arranged in series, as shown, and each flat tooth is at an angle, or partially turned in the manner shown in the end views of these teeth in Fig. 1. Fig. 7 also displays it. It will be observed in Fig. 1 that each series of every two opposite sets of teeth is so set that as they revolve the teeth of one rake will strike the spaces corresponding to those between the teeth of its opposite rake. In other words, the teeth of each two opposite rakes on each shaft break joint with the teeth of the other in their revolution. The slant or partial turn given to each tooth of the rakes corresponds upon each single shaft, so that the operation of revolving the rakes throws the ore in one direction in each retort. Each section of comb is composed of the teeth and a comb bar or back, which latter terminates in two rings, D" D". (See Fig. 7.) These rings are secured to the hollow shaft by means of the circular clamps E. Each of these clamps E is composed of two half-sections secured around the hollow shaft by means of ears and bolts cast upon the adjoining ends of each half-section. (See Fig. 10.) Upon each half-section are cast ears or lugs E' E', to which are bolted the rings D" of the comb D'. (See Figs. 1 and 10.) Small projections F F, located upon the interior surface of each clamp E, set into corresponding recesses in the hollow shafts, and prevent the clamps from turning thereon. The hollow shaft in retort B receives at one end a current of water through water-supply pipe G. (See Figs. 1 and 3.) This current flows through the shaft and down through water-pipe G' to the hollow shaft in retort B'; thence through this hollow shaft to water-pipe G''; thence into and through the hollow shaft in retort B'', water-pipe G''', hollow shaft in retort B''' to and out of the exit-pipe G$^{iv}$. All of these pipes join the revolving hollow shafts (see enlarged view, Fig. 6) by suitably-packed water-joints, and each pipe has a bend or curve in it, such as is shown in Fig. 3 at H H. This bend is intended to "give" to the vertical expansion and contraction of the furnace to avoid the straining of the water-pipes. Ore passages or openings are made in the front and back walls of the furnace from one end of each retort to the one beneath it. These openings are located at a sufficient distance from such ends to insure the ore which is dropping down coming in contact with the rakes in the retort, to which it has dropped. (See I I' I'', Fig. 1.) Opening I''' is the ore-entrance opening below the hopper J. Opening I$^{iv}$ is the ore-exit opening, whence, after being roasted, it passes out. The retorts terminate in the thick brick walls of the furnace, and the interior brick-work or brick flooring, K K K K, (see Fig. 4,) is so constructed as to partially inclose each retort B B' B'' B''' along its side, or lengthwise of the retort, the alternate ends of this vertical series of brick floors being open, whereby heat passes upward in a zigzag course from the furnace-fire in the direction of the arrows shown in Fig. 4, and finally out of the stack or chimney C'. Each section of brick-work flooring K, as is shown in Fig. 4, terminates at one end at a short distance from the end wall of the furnace, thus leaving an opening or heat-passage at that end, through which the heat ascends. The alternate floors K terminate at opposite ends, (see Fig. 4, Sheet 4,) thus rendering the course of the ascending heat tortuous or zigzag. Now, these openings or passages would be long and narrow, if it were not for the fact that we make recesses at each side of the furnace opposite each of these openings simply to enlarge the latter, (see K' K' K', Fig. 2, and K'' K'' K'', same figure.) Those recesses marked K' are at one end of the furnace, while those marked K'' are at the opposite end of the same. (Shown in dotted lines.)

It will be seen that we employ two vertical series of retorts, and a description of one series will answer for both. The rakes in each series are driven by means of cog-wheels L L L, one of which is located upon the end of each hollow shaft, where that end projects through the furnace-walls. (See Figs. 1 and 3.) These cog-wheels are located on the hollow shafts between the water-pipes G G'', &c., and the furnace-wall. They receive motion from worm-wheels gearing into them, which are located upon the vertical shafts L' L', (see Fig. 3,) which shafts L' L' are in turn driven by suitable cogs and pulleys above. (See same figure.) Oil-boxes M M, terminating in troughs under the cogs L L, are secured around the upright shafts L' L' at intervals, as shown, and they envelop the worm-wheels. These boxes and troughs catch and hold the oil used to lubricate the cogs and worm-gearing.

The view shown in Fig. 2 is designed to illustrate our system of carrying off the fumes from the retorts into two side dust-chambers through the passages O O' O'' O''', &c., each vertical series of retorts being furnished with a side dust-chamber, N N'. As the fumes rise through the passages O O', &c., should any fine dust pass out with the fumes it will be carried into the dust-chambers with said fumes, in which chambers, as the air-currents are slow, the dust will settle, and can then be collected. Each passage O O', &c., is furnished with an ordinary damper, which is turned from the outside of the furnace-walls by means of the bars P' P', which bars are attached to the outer ends of the rods upon which the dampers swing. At one end of each retort we provide one or more air-entrance openings, Q Q', closed by weighted slide-doors Q'' Q''', so devised that by pushing the weight up on a curved rib, which fits in a slot in the weight, the latter will jam and hold the door closed, and by reversing the motion of the weight the latter will be freed, opening the door in its descent, and its weight will hold the slide-door open. (See Fig. 5.) The retorts, being subjected to heat, will expand and contract. It therefore becomes necessary to so set the hollow shafts revolving therein as to prevent the rake-teeth from striking the sides of the retort. To accomplish this each end or head of each retort is provided with an opening, through which the hollow shaft passes, of greater diameter than the hollow shaft itself. A large plate encircles the neck of the shaft, immediately outside of the retort-head, of such size that, whether the shaft is shifted laterally or vertically, this plate will always cover the hole in the head of the retort. In order to adjust the shaft to such a line as will free the revolving rakes, we mount each end of each shaft in a housing, such as is shown in Fig. 9, Sheet 5. In this figure, D is the end of the hollow shaft. R R' are vertically adjusting screws bearing against the bearings S S', respectively, to raise and lower the shaft. R'' R''' are lateral adjusting-screws to shift the pedestal sidewise, which of course will move the shaft. The screw R' passes through a slotted opening in the ledge T, to admit of lateral movement with the housing. This movement or adjustment will be very slight. On that end of the shaft carrying the cog-wheel L the supporting-housing is located between the cog-wheel and the end of the retort, as shown in Fig. 11. We have not shown this in Fig. 1, on account of lack of space. Upon the opposite end of the shaft the housing is located between the joint of the water-pipe and the head of the retort.

The operation is as follows: Fire is built in the furnace C, and the products of combustion pass under, between, and over each tier of retorts, through the flues at alternate ends of each tier of retorts, in a zigzag course, through the heat-space A', in the manner indicated by the arrows in Fig. 4, Sheet 4, and after being utilized they pass out through the stack or chimney C', the damper in which has been opened. The ore, after being properly prepared, is fed into the top retort, B, (see Fig. 1,) from the hopper above, through ore-feed pipe I'''. At the same time the rakes are started by revolving the shafts, to which they are attached by the means described, and a cooling-current of water is either pumped or run by gravity through the series of water-pipes and hollow shafts, thereby preventing the shafts revolving in the retorts from bending or sagging by reason of the heat. The feed of ore through pipe I''' is continuous, and the quantity of ore so fed into retort B is controlled at pleasure. The motion of the rakes stirs up and thinly spreads the mass of ore and brings all the particles thereof into contact with the hot air in the retort and the heated walls of the same, thereby presenting a large and ever-changing surface of ore to the action of the heat and air, the stirring of the ore being thorough and regular. The "set" of the rake-teeth is such as gradually to drive the roasting ore toward the opening I. Upon reaching this opening it drops in a continuous stream into retort B'. Here the operation of stirring and roasting continues, as before, and the rake-teeth of this retort drive the ore toward opening I', where it drops into retort B'', whence it continues in a similar manner through the various retorts and passages, being roasted and stirred until its final exit through passage I^iv. The operation is thus continuous and automatic. The ore is fed through the pipe I''' in such quantity as not to choke up or fill any one or more of the retorts, whereby the action of the rakes spreads the mass of ore at the same time that the latter is stirred, and every particle of ore is subjected to the action of the heat. Each end of each retort is furnished with air-openings Q Q'. As it is necessary to introduce air into the retorts to promote the desulphurizing of the ore and the base metals therein, the air-passage in the discharge end of retort B''' is opened and the fume-passage from the uppermost retort into the dust-chamber is opened near the receiving end of the upper retort. A draft is thus created from the said air-opening up through the series of retorts into the dust-chamber, and the current of air will travel in the line or course of this draft against and through the moving mass of ore being treated. Both air-openings in the retort B''', at the end referred to, can be opened if more air is needed, or, if still more air is desired, some of the air-passages in the other retorts can be opened. If it is found that the ore, say, in the upper retort is being too rapidly heated and is liable to fuse or mat, the passage from that retort to the dust-chamber can be closed and the corresponding passage in the next lower retort opened, which will result in carrying the air and fumes off before the latter reach the top retort, which will result in reducing the heat in the latter and preventing the matting of the ore therein.

In case it is desired to reverse the direction of the air-current throughout the whole series of retorts and carry it from top to bottom, the openings and passages last described are closed, and the air-openings Q Q' at the receiving end of retort B are opened, and the passage leading from the retort B''' to the dust-chamber from the delivery end of retort B''' is opened. The air, in this case, will traverse from top to bottom throughout the whole series of retorts. The air will always traverse the retorts from any open air-passage to the point where there is an open fume-passage into the dust-chamber. Both ends of each lower retort may be furnished with passages into the dust-chamber.

As will be seen by Fig. 2, it would appear that the retorts B' and B''' only of each series are furnished with fume-passages to the dust-chambers; but, in fact, the retorts B and B'' of each series are also so provided, but the fume-passages of the latter are near the rear of the furnace, and not shown in the view referred to, which shows only the fume-passages which are set near the front of the furnace—to wit, the fume-passages of retorts B and B'' are near the rear of the furnace, while those of retorts B' and B''' are near the front. Retorts B''' are furnished with fume-passages into the neighboring dust-chambers near both the front and rear ends. The horizontal arched walls in the two dust-chambers N' N' (shown in Fig. 2) are narrow structures simply intended to give strength to the side walls of the furnace.

Heretofore in roasting ores the ore has been carried through the series of retorts in a thick mass occupying most of the interior of each retort, and for thorough roasting reliance has been placed upon the constant changing of the position of the particles and bringing them in contact with the walls of the retort, as well as the heated air passing through the same. This does not always result in a thorough roasting, as it is difficult to reach all the particles. One of the features of our invention is designed to remove this difficulty. This we accomplish by carrying the ore through the retorts in a thin layer, which is kept constantly disturbed by means of the revolving vanes or stirrers, and subjecting it to heat while in such state. The ore may be so treated in other apparatus than that shown by us, and therefore in one clause of our claim we have claimed, broadly, the process of so treating the ore.

What we claim as new is—

1. In an ore-roaster, the combination of ore-feed pipe I''', retorts B B' B'' B''', vanes or rakes D' D' D' for spreading the ore in a thin sheet, passages I I' I'' for carrying the ore from one retort to another, discharge-passage I$^{iv}$, dust-chamber N, air-opening Q, and a fume-passage, O'', into dust-chamber N in the ore-discharge end of lower retort, B''', and a fume-passage and an air-opening from the ore-receiving end of upper retort, B, into a contiguous dust-chamber, N, whereby the draft can be directed from the lower retort through the series to the upper, or vice versa, substantially as described.

2. In an ore-roaster, a series of retorts, B B' B'' B''', connected one with the other by suitable ore-passages, I I' I'', the said retorts being provided at one or both ends with air-passages Q, provided with suitable regulating-covers, Q''', and also provided near one or both ends with fume conduits or passages O O'' into a dust-chamber, N, said fume-passages being capable of being closed or opened by dampers or valves P, whereby by the opening of any fume-passage O, when an air-passage Q has been opened, a draft will be induced from the air-passage to the fume-passage, substantially as described.

3. In an ore-roaster, a series of retorts, B B' B'' B''', connected one with the other by suitable ore-passages, I I' I'', the fume-passages O O', &c, located at ends of the successive retorts in each series, and connecting the interiors of the retorts with a suitable dust-chamber, N, and provided with suitable mechanism, P, to regulate draft or close the fume-passages, substantially as described.

4. In an ore-roaster, a double vertical series of retorts, B' B'' B''', the retorts in each series being connected one with the other by suitable ore-passages, I I' I'', and dust-chambers N N', each adjoining one of said two series of retorts, and connected thereto by fume-passages O O' O'' O''', substantially as described.

5. In an ore-roaster, the combination of a retort, B, centrally-revolving longitudinal shaft D, rakes D', mounted in a series of longitudinal sections rigidly upon said shaft, by means of the sectional rings E E, the sections of each of said rings being joined by ears and bolts, and the bases of the rake-sections being secured to lugs projecting from said rings by means of bolt-screws or rivets, substantially as described.

THOS. WALKER.
JNO. F. CARTER.

Witnesses:
WM. H. CARSON,
GEORGE E. BUCKLEY.